(12) United States Patent
Kobayashi et al.

(10) Patent No.: US 9,867,108 B2
(45) Date of Patent: Jan. 9, 2018

(54) WIRELESS PARAMETER CONTROL APPARATUS, WIRELESS BASE STATION, WIRELESS COMMUNICATION SYSTEM, WIRELESS PARAMETER CONTROL METHOD, AND PROGRAM

(71) Applicant: NEC Corporation, Minato-ku, Tokyo (JP)

(72) Inventors: Kosei Kobayashi, Tokyo (JP); Hiroto Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 14/909,516

(22) PCT Filed: Aug. 12, 2014

(86) PCT No.: PCT/JP2014/071258
§ 371 (c)(1),
(2) Date: Feb. 2, 2016

(87) PCT Pub. No.: WO2015/022952
PCT Pub. Date: Feb. 19, 2015

(65) Prior Publication Data
US 2016/0174125 A1 Jun. 16, 2016

(30) Foreign Application Priority Data

Aug. 13, 2013 (JP) ................................. 2013-168122

(51) Int. Cl.
*H04W 36/30* (2009.01)
*H04W 16/08* (2009.01)
(Continued)

(52) U.S. Cl.
CPC ........... *H04W 36/30* (2013.01); *H04W 16/08* (2013.01); *H04W 24/02* (2013.01); *H04W 36/08* (2013.01); *H04W 36/22* (2013.01)

(58) Field of Classification Search
None
See application file for complete search history.

(56) References Cited

U.S. PATENT DOCUMENTS

| 2013/0242720 A1* | 9/2013 | Chou | ................ | H04W 28/0268 |
|---|---|---|---|---|
| | | | | 370/221 |
| 2014/0140278 A1* | 5/2014 | Chou | ................ | H04W 28/0268 |
| | | | | 370/328 |
| 2014/0302853 A1* | 10/2014 | Militano | ........... | H04W 36/0055 |
| | | | | 455/436 |

FOREIGN PATENT DOCUMENTS

| EP | 2621211 A1 | 7/2013 |
|---|---|---|
| JP | 2012-119958 A | 6/2012 |

(Continued)

OTHER PUBLICATIONS

International Search Report for PCT Application No. PCT/JP2014/071258, dated Nov. 18, 2014.

(Continued)

*Primary Examiner* — Diane Lo

(57) ABSTRACT

A wireless parameter control device comprises: a serving cell prediction unit (11) which predicts a wireless cell which is a connection destination of a first wireless terminal within a first wireless cell upon assuming that an offset value which is added to the wireless quality which the first wireless terminal measures for each wireless cell is changed to a prescribed candidate value; a communication speed index prediction unit (12) which predicts a communication speed index of the first wireless terminal upon assuming that the offset value is changed to the prescribed candidate value and/or a communication speed index of a second wireless terminal within a second wireless cell which is present in the periphery of the first wireless cell; and a coverage control unit (13) which, on the basis of the result of the prediction of the communication speed index, controls the coverage of (Continued)

the first wireless cell and/or the coverage of the second wireless cell.

16 Claims, 7 Drawing Sheets

(51) Int. Cl.
    *H04W 24/02* (2009.01)
    *H04W 36/22* (2009.01)
    *H04W 36/08* (2009.01)

(56) References Cited

FOREIGN PATENT DOCUMENTS

| | | |
|---|---|---|
| JP | 2013-125972 A | 6/2013 |
| WO | 2000/072618 A1 | 11/2000 |
| WO | 2011/136083 A1 | 11/2011 |
| WO | 2013/046502 A1 | 4/2013 |

OTHER PUBLICATIONS

English translation of Written opinion for PCT Application No. PCT/JP2014/071258.

* cited by examiner

WIRELESS PARAMETER CONTROL APPARATUS, WIRELESS BASE STATION, WIRELESS COMMUNICATION SYSTEM, WIRELESS PARAMETER CONTROL METHOD, AND PROGRAM

This application is a National Stage Entry of PCT/JP2014/071258 filed on Aug. 12, 2014, which claims priority from Japanese Patent Application 2013-168122 filed on Aug. 13, 2013, the contents of all of which are incorporated herein by reference, in their entirety.

TECHNICAL FIELD

The present invention relates to a wireless parameter control apparatus, a wireless base station, a wireless communication system, a wireless parameter control method, and a program in a wireless communication network.

BACKGROUND ART

In a cellular wireless communication network, a representative of which is a portable telephone, a wide service area is constituted by dispersing a plurality of wireless base stations. Each wireless base station forms a wireless cell being a range in which devices can communicate with that wireless base station, and about one to six wireless cells are managed by a single wireless base station. In addition, by an overlap of the coverage of adjacent wireless cells (overlap region), even when a wireless terminal (User Equipment (UE)) crosses over the wireless cells, such a wireless terminal can continue communication by means of handover processing (Handover (HO)).

Normally, a wireless terminal measures the wireless quality (hereinafter referred to as "wireless quality of wireless cell") of a radio wave (signal) arriving from each wireless cell, and connects to a wireless cell having the best wireless quality. An example of the wireless quality here is a received power or a received quality. The received power represents a receiving strength of a pilot signal or a reference signal transmitted from a wireless cell, and includes CPICH RSCP (Common Pilot Channel Received Signal Code Power) for the WCDMA (Wideband Code Division Multiple Access), (WCDMA is a registered trademark) network and RSRP (Reference Signal Received Power) for the LTE (Long Term Evolution) network. On the other hand, the received quality is a signal to noise ratio of a signal received from a certain wireless cell, and includes SINR (Signal to Interference plus Noise Ratio), CPICH Ec/No for the WCDMA (registered trademark) network, and RSRQ (Reference Signal Received Quality) for the LTE network.

So as to enhance a communication capacity of a wireless communication network, when the imbalance of traffic load is great between adjacent wireless cells, load balancing is often performed by adjusting the coverage of the wireless cells. Specifically, the traffic load balancing is attempted by either reducing the coverage of the wireless cells having a high traffic load or enlarging the coverage of wireless cells having a low traffic load. Some examples of means for adjusting the coverage are wireless cells' transmit power, antenna tilt angle, and an offset parameter to the wireless quality.

Here, examples of an offset parameter to the wireless quality are CIO (Cell Individual Offset), Qoffset, Event A3 offset, HO Hysteresis. The values substituted into these offset parameters are referred to as "offset value." These offset values are reported from the wireless cell to "the wireless terminal whose serving cell (the connected wireless cell) is that wireless cell" or to "the wireless terminal whose best cell (the wireless cell having the highest wireless quality) is that wireless cell," and are used for cell selection in the wireless terminal. Specifically, when each wireless terminal, while in communication, determines a wireless cell to connect to by comparing the wireless quality of the wireless cell (serving cell) to which that wireless terminal is connected, to the wireless quality of a wireless cell (target cell) other than the serving cell, that wireless terminal adds the reported offset value to the wireless quality of the target cell. Alternatively, when each wireless terminal, while not in communication (in an idle state), determines a wireless cell to connect to by comparing the wireless quality of the best cell to the wireless quality of a wireless cell (target cell) other than the best cell, that wireless terminal adds the reported offset value to the wireless quality of the target cell.

It should be noted that there are two types of offset parameters. One type of offset parameter uses a common value to all the target cells (hereinafter referred to as "offset parameter common to the target cells"); and the other type of offset parameter uses a separate value to each target cell (hereinafter referred to as "offset parameter specific to each target cell"). The above-described Event A3 offset, HO Hysteresis are offset parameters common to the target cells, and CIO, Qoffset are offset parameters specific to each target cell. For example, consider a case in which the CIO from the wireless cell A to the wireless cell B is set to be a negative value and the CIO from the wireless cell A to the wireless cell C is set to be a positive value. In such a case, "the wireless quality of the wireless cell B" measured by "the wireless terminal connected to the wireless cell A" is treated as a value lower from the actually measured value by the offset value, and as a result, the coverage of the wireless cell B with respect to the wireless A becomes smaller. Likewise, "the wireless quality of the wireless cell C" measured by "the wireless terminal connected to the wireless cell A" is treated as a value higher than the actually measured value by the offset value, and a result, the coverage of the wireless cell C with respect to the wireless cell A becomes larger. It should be noted here that there is also a method to add an offset value only to the wireless quality of the serving cell or to the best cell, without adding the offset value to the wireless quality of the target cell. However, in the present invention, such an offset parameter is treated as one type of offset parameter common to the target cells.

The technique to increase or decrease the coverage of the wireless cell taking advantage of the offset parameters with respect to the wireless quality as explained above is also known as a technique "Cell Range Expansion (CRE)". Using a CRE enables each wireless cell to form coverage equal to or greater than in the case in which the largest transmission power is set. In the following explanation, the offset parameter with respect to the wireless quality is abbreviated as "wireless quality offset parameter" where necessary.

In the explanations hereafter, such an expression as "wireless terminal in the wireless cell" or "wireless terminal within the wireless cell" means that a wireless terminal whose serving cell or best cell is that wireless cell.

An operation to manually adjust the coverage of a wireless cell is a cause for increase in operation cost of the wireless communication network. With this in view, a technology to automatically perform such an operation has been examined. Some examples of it are CCO (Coverage and Capacity Optimization) and MLB (Mobility Load Balancing) which are use cases of SON (Self Organizing Network) under standardization in the 3GPP (3rd Generation Partnership Project).

Patent Literature No. 1 and Patent Literature No. 2 disclose methods to automatically optimize a wireless quality offset parameter. According to the method disclosed in Patent Literature No. 1, the traffic load of the wireless cell A is measured, and when the traffic load for the wireless cell A is high, the wireless cell B which is around the wireless cell A and has a large overlap with the wireless cell A is selected from the wireless cells around the wireless cell A and having a low traffic load. Then, the offset value from the wireless cell A with respect to the wireless cell B is increased, to enlarge the coverage of the wireless cell B with respect to the wireless cell A. On the other hand, according to the method disclosed in Patent Literature No. 2, the wireless base station NB1 transmits, to the other wireless base station NB2, a representative throughput value TP1 of the wireless terminal connected to itself. The wireless base station NB2 compares the received representative throughput value TP1 with the representative throughput value TP2 of the wireless terminal connected to itself. Then, the wireless quality offset parameter is controlled so as to correct the difference in representative throughput value (TP1−TP2) between the wireless base stations.

CITATION LIST

Patent Literature

Patent Literature No. 1: WO 2000/072618 pamphlet
Patent Literature No. 2: WO 2011/136083 pamphlet

SUMMARY OF INVENTION

Technical Problem

Patent Literate No. 1 describes to control the wireless quality offset parameter so as to balance the traffic loads between the wireless cells. However, balancing the traffic loads between the wireless cells does not explicitly take into consideration the throughput of the wireless terminal. Therefore, it does not necessarily lead to optimization of the throughput terminal of the wireless terminal.

Patent Literature No. 2 describes to control the wireless quality offset parameter using the measured value of the throughput at each occasion. However, the throughput characteristic after changing the wireless quality offset parameter can only be known when the wireless quality offset parameter is actually changed. Therefore, a trial and error type of control may deteriorate the throughput characteristic or result in a local optimal solution.

OBJECT OF THE PRESENT INVENTION

The present invention is made in view of the above-described problem, and its exemplary objective is to realize a wireless parameter control apparatus capable of controlling coverage of a wireless cell so as to improve the throughput characteristic.

Solution to Problem

A wireless parameter control apparatus according to an exemplary first aspect of the present invention is a wireless parameter control apparatus in a wireless communication system in which a wireless cell which is connected to by a wireless terminal can be controlled by adding an offset value to a wireless quality of each wireless cell measured by the wireless terminal, including: a first predicting unit for predicting a wireless cell which is connected to by a first wireless terminal in a first wireless cell upon assuming that an offset value to be added to a wireless quality of each wireless cell measured by the first wireless terminal is changed to a predetermined candidate value; a second predicting unit for predicting at least one communication speed index of a communication speed index of the first wireless terminal and a communication speed index of a second wireless terminal in a second wireless cell existing around the first wireless cell upon assuming that the offset value is changed to the predetermined candidate value; and a control unit for controlling at least one coverage of coverage of the first wireless cell and coverage of the second wireless cell based on a prediction result of the communication speed index.

A wireless parameter control method according to an exemplary second aspect of the present invention is a wireless parameter control method for a wireless parameter control apparatus in a wireless communication system in which a wireless cell which is connected to by a wireless terminal can be controlled by adding an offset value to a wireless quality of each wireless cell measured by the wireless terminal, including: predicting a wireless cell which is connected to by a first wireless terminal in a first wireless cell upon assuming that an offset value to be added to a wireless quality of each wireless cell measured by the first wireless terminal is changed to a predetermined candidate value; predicting at least one communication speed index of a communication speed index of the first wireless terminal and a communication speed index of a second wireless terminal in a second wireless cell existing around the first wireless cell upon assuming that the offset value is changed to the predetermined candidate value; and controlling at least one coverage of coverage of the first wireless cell and coverage of the second wireless cell based on a prediction result of the communication speed index.

A program according to an exemplary third aspect of the present invention is a program for a wireless parameter control apparatus in a wireless communication system in which a wireless cell which is connected to by a wireless terminal can be controlled by adding an offset value to a wireless quality of each wireless cell measured by the wireless terminal, the program making a computer as a wireless parameter control apparatus execute: a process of predicting a wireless cell which is connected to by a first wireless terminal in a first wireless cell upon assuming that an offset value to be added to a wireless quality of each wireless cell measured by the first wireless terminal is changed to a predetermined candidate value; a process of predicting at least one communication speed index of a communication speed index of the first wireless terminal and a communication speed index of a second wireless terminal in a second wireless cell existing around the first wireless cell upon assuming that the offset value is changed to the predetermined candidate value; and a process of controlling at least one coverage of coverage of the first wireless cell and coverage of the second wireless cell based on a prediction result of the communication speed index.

A wireless parameter control system according to an exemplary fourth aspect of the present invention is a wireless communication system including: the above-described wireless parameter control apparatus; a plurality of wireless base stations connected to the wireless parameter control apparatus; and a plurality of wireless terminals each of which is connected to at least one of the plurality of wireless base stations.

A wireless base station according to an exemplary fifth aspect of the present invention is a wireless base station comprising the above-described wireless parameter control apparatus.

Advantageous Effects of Invention

An exemplary effect of the present invention is to predict the serving cell and the throughput of the wireless terminal upon assuming that having changed the wireless quality offset parameter, and to enable control of the coverage of the wireless cell so as to improve the throughput characteristic so as to control the coverage of the wireless cell to improve the throughput.

DESCRIPTION OF EMBODIMENTS

Exemplary embodiments for practicing the present invention will be detailed with reference to the drawings. In each drawing, the same or corresponding elements are assigned the same reference number, and overlapping explanation is omitted where necessary.

The First Exemplary Embodiment

Figure 1:
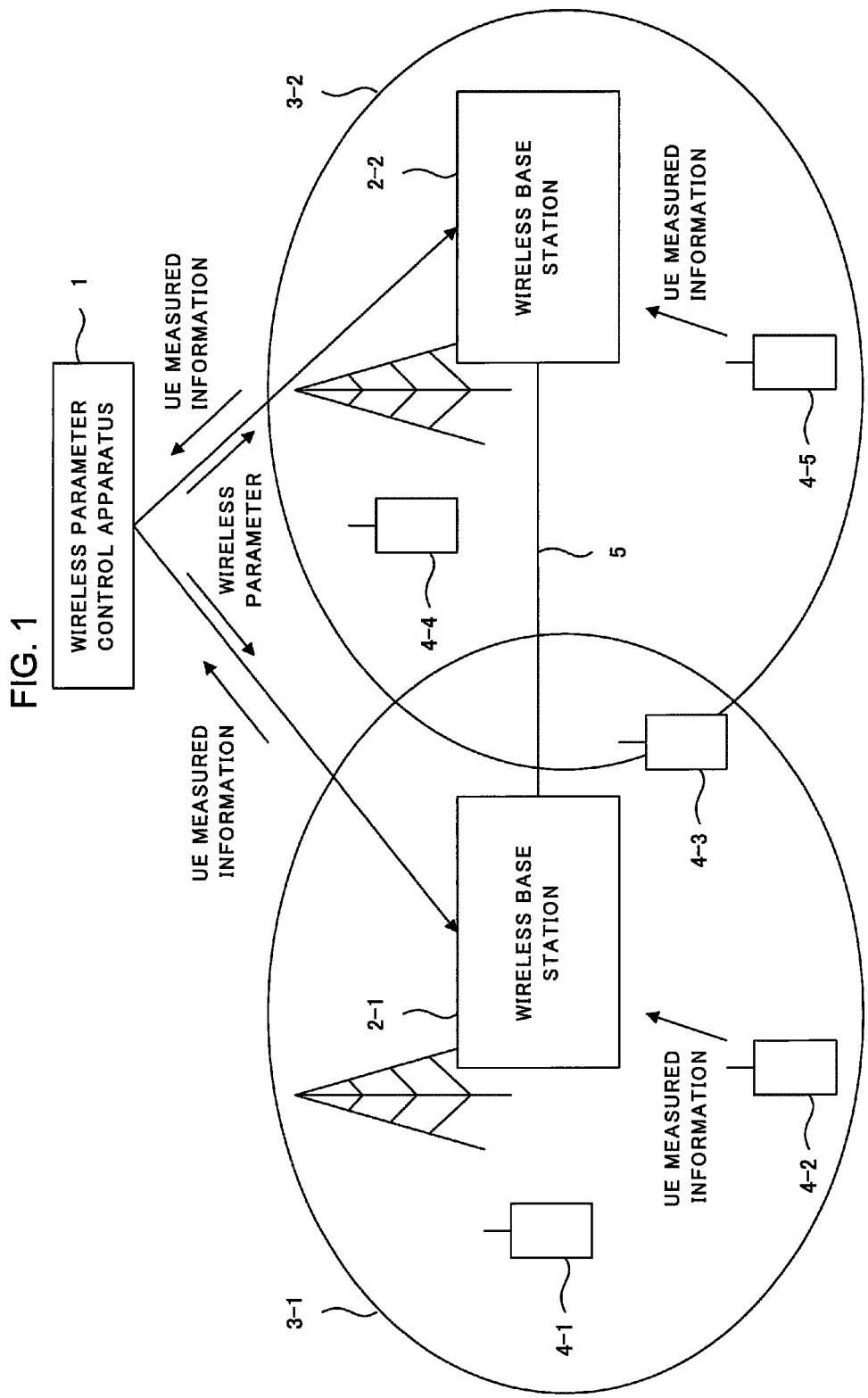
FIG. 1 is a diagram showing an example of a configuration of a wireless communication network including a wireless parameter control apparatus according to the first exemplary embodiment of the present invention.

FIG. 1 is a diagram showing an example of a configuration of a wireless communication network (wireless communication system) which includes a wireless parameter control apparatus 1 according to the first exemplary embodiment of the present invention. The wireless communication network shown in FIG. 1 includes one wireless parameter control apparatus 1, two wireless base stations 2-1, 2-2, and two wireless cells 3-1, 3-2. In addition, the wireless cell 3-1 includes three wireless terminals 4-1, 4-2, 4-3, and the wireless cell 3-2 includes three wireless terminals 4-3, 4-4, 4-5. The wireless terminal 4-3 exists on the overlapping region between the wireless cell 3-1 and the wireless cell 3-2. Here, the serving cell of the wireless terminal 4-3 is assumed to be the wireless cell 3-1. Note that the number of constituting elements herein is one example, and is not limited to such number.

The wireless base station 2-1 manages the wireless cell 3-1, and performs bidirectional wireless communication with the wireless terminals (UE) 4-1 through 4-3. The wireless base station 2-2 manages the wireless cell 3-2, and performs bidirectional wireless communication with the wireless terminals (UE) 4-4 and the wireless terminals (UE) 4-5. The wireless base stations 2-1, 2-2 are connected to a hosting network (not shown in the drawing), and relays traffics between the wireless terminals 4-1 through 4-5 and the hosting network. The hosting network includes a wireless access network and a core network. Note that each of the wireless base station 2-1, 2-2 is, for example, any one of a macro base station covering a wide area, a micro wireless base station covering a comparatively small area, a pico wireless base station, and a femto wireless base station, and a relay base station that relays wireless signals of a wireless cell 3-1 or a wireless cell 3-2. The wireless parameter control apparatus 1 obtains measured information from the wireless base stations 2-1, 2-2, and determines a wireless parameter for controlling the coverage of at least one of the wireless cells 3-1 and 3-2.

Examples of measured information which the wireless parameter control apparatus 1 obtains from the wireless base stations 2-1, 2-2 include the traffic load of each of the wireless cells 3-1 and 3-2 and the communication statistics quality of each of the wireless cells 3-1 and 3-2 measured in the wireless base stations 2-1, 2-2, and the measured information (UE measured information) of each of the wireless terminals 4-1 through 4-5 reported by the wireless terminals 4-1 through 4-5 to the wireless base stations 2-1, 2-2.

An example of the traffic load measured at each of the wireless base stations 2-1 and 2-2 is a resource utilization rate, which specifically includes PRB (Physical Resource Block) utilization rate and the ratio of the used transmission power to the maximum transmission power. As information to represent the traffic load, information concerning the number of UEs such as the number of simultaneously communicating UEs and the number of active UEs may be obtained. Examples of the communication statistics quality include the number of communications having occurred, an abnormal termination rate of communication, the number of handovers, the ratio of handover failure and the like.

The UE measured information reported from the wireless terminals 4-1 through 4-5 to the wireless base stations 2-1, 2-2 at least include a wireless quality of a wireless cell 3-1 and/or a wireless cell 3-2 measured by the wireless terminals 4-1 through 4-5 respectively. As described above, a receiving strength and a received quality, i.e., CPICH RSCP, Ec/No, SINR for the WCDMA network and RSRP, RSRQ, SINR for the LTE network are some examples of the wireless quality. Indices of quantizing a wireless quality such as CQI (Channel Quality Indicator) may also be obtained as UE measured information. Furthermore, the UE measured information may include communication speed indices such as throughput, event information on occurrence or non-occurrence of such as abnormal termination or handover failure, measured time, a wireless cell identifier indicating the wireless cell whose wireless quality is measured, and an identifier of a wireless terminal reporting the UE measured information.

The wireless parameters that the wireless parameter control apparatus 1 determines to control the coverage of each of the wireless cells 3-1, 3-2 include an antenna tilt angle, an antenna azimuth angle, transmission power, and wireless quality offset parameter for each wireless cell. As described above, examples of the offset parameters with respect to the wireless quality are CIO (Cell Individual Offset), Qoffset, Event A3 offset, and HO Hysteresis. The value substituted into these offset parameters is referred to as "offset value."

Figure 2:
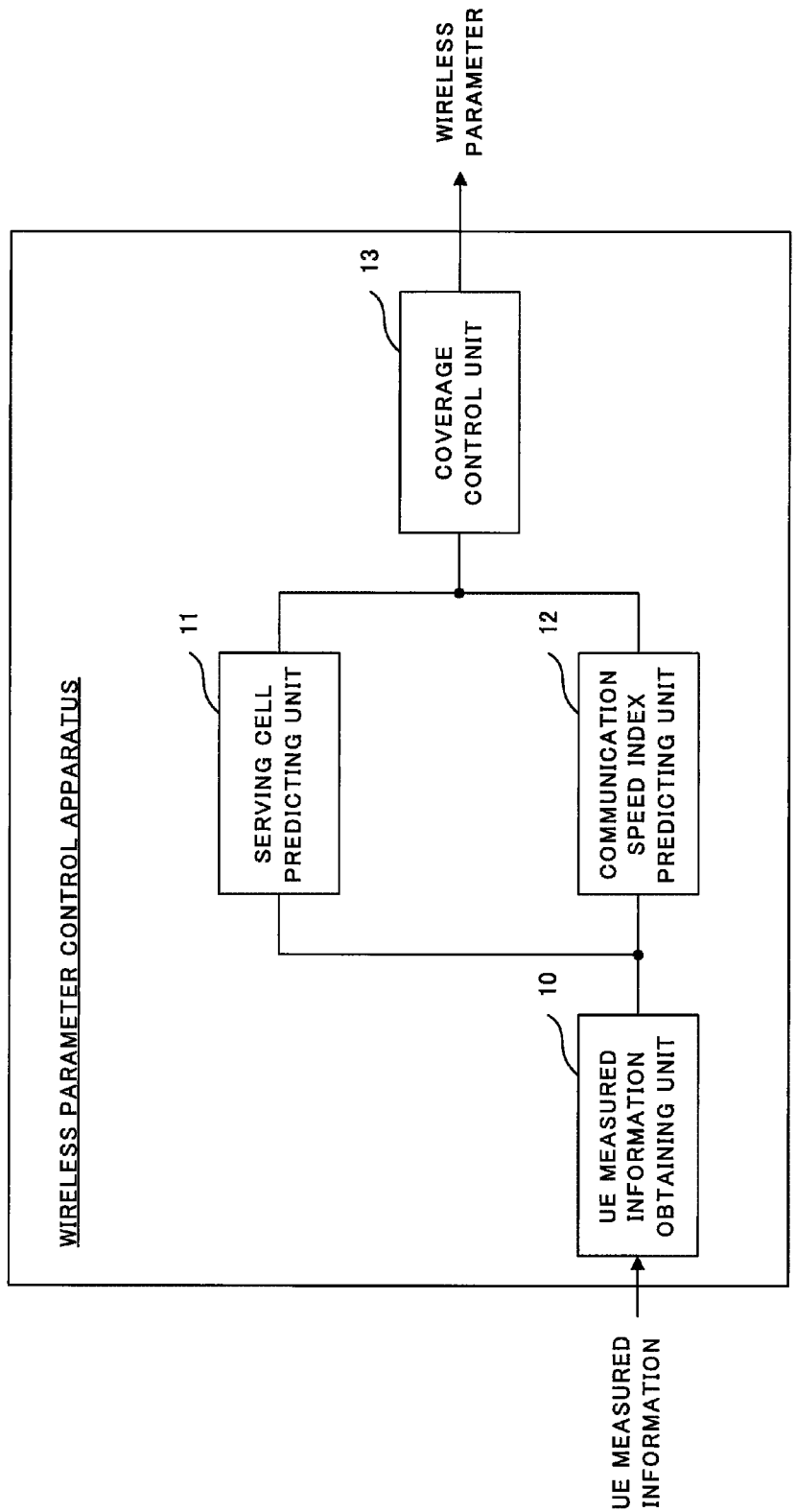
FIG. 2 is a block diagram showing an example of a configuration of a wireless parameter control apparatus according to the first exemplary embodiment of the present invention.

FIG. 2 is a block diagram showing an example of a configuration of a wireless parameter control apparatus 1.

The UE measured information obtaining unit 10 obtains information (UE measured information) measured by each of the wireless terminals 4-1 through 4-5. Instructions to wireless terminals 4-1 through 4-5 for measurement and reporting may be performed by the wireless base stations 2-1 and 2-2 without going through the wireless parameter control apparatus 1; alternatively, the UE measured information obtaining unit 10 of the wireless parameter control apparatus 1 may make such instructions via the wireless base stations 2-1 and 2-2. For example, while the wireless terminal 4-3 is in the communication state or in the idle state, the UE measured information obtaining unit 10 instructs the wireless terminal 4-3 to measure or report in each predetermined period (for example, every 1 second or every 1 minute) or when a predetermined event has occurred (for example, at the start of communication, at the end of communication, at the time of handover, at the time of abnormal termination) the wireless quality of either a wireless cell (for example wireless cell 3-1 and the wireless cell 3-2) that can be detected by the wireless terminal 4-3 or a specific wireless cell (for example, the wireless cell 3-1) for which such measurement is instructed. The measured information of the wireless terminals 4-1 through 4-5 measured by means of the MDT (Minimization of Drive Tests) function of which the standardization is under progress from 3GPP Release 9 may be used. The UE measured information obtaining unit 10 is a first obtaining unit.

The serving cell predicting unit 11 predicts each serving cell of the wireless terminals 4-1 through 4-5 assuming that the wireless quality offset parameter is changed to a predetermined candidate value. The details of a method for predicting a serving cell are described later. Note that the serving cell predicting unit 11 does not have to perform prediction of the serving cell for all the wireless terminals 4-1 through 4-5, but may perform such prediction only to a part of such wireless terminals. The serving cell predicting unit 11 is a first predicting unit.

The communication speed index predicting unit 12 predicts each communication speed index (for example throughput) of the wireless terminals 4-1 through 4-5 that would result assuming that the wireless quality offset parameter is changed to a predetermined candidate value. The details of a method to predict communication speed indices are described later. Note that the communication speed index predicting unit 12 does not have to perform prediction of communication speed indices for all the wireless terminals 4-1 through 4-5, but may perform such prediction only to a part of such wireless terminals. For example, when controlling the wireless parameter of the wireless cell 3-1, it is possible either to predict the communication speed indices for all the wireless terminals 4-1 through 4-5, to predict the communication speed index of only the wireless terminal whose serving cell is the wireless cell 3-1, or to predict the communication speed index of only the wireless terminal whose serving cell is the wireless cell 3-2. The communication speed index predicting unit 12 is a second predicting unit.

The coverage control unit 13 controls the coverage of at least one of the wireless cells 3-1 and 3-2, based on the prediction result of the communication speed indices of the communication speed index predicting unit 12. The wireless parameter that can control the coverage of the wireless cells 3-1 and 3-2 includes an antenna tilt angle, an antenna azimuth angle, transmission power, and wireless quality offset parameter of each of the wireless cells 3-1 and 3-2. The coverage control unit 13 notifies, of the determined wireless parameter of the wireless cell, the wireless base station managing that wireless cell, and instructs the wireless parameter update. The coverage control unit 13 is a control unit.

Figure 3:
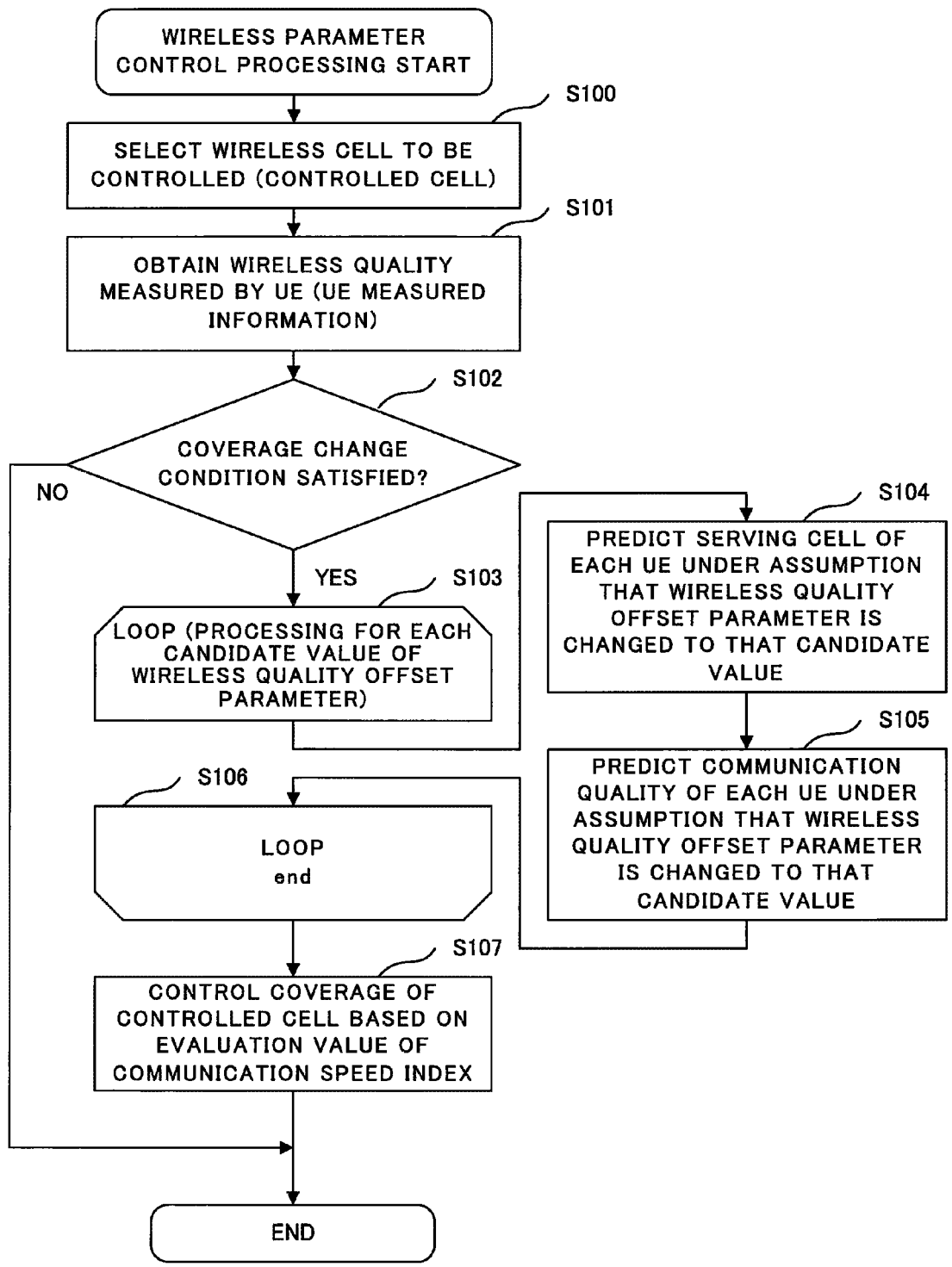
FIG. 3 is a flowchart showing an example of wireless parameter control processing performed by a wireless parameter control apparatus according to the first exemplary embodiment of the present invention.

The following describes, with reference to the flowchart of FIG. 3, a specific example of wireless parameter control processing by the wireless parameter control apparatus 1 according to the present exemplary embodiment. Here, unless otherwise specified, the description is performed without limiting to the configuration of the wireless communication network shown in FIG. 1 (i.e., the configuration having two wireless cells and two wireless base stations). Note that in the description hereafter, the wireless quality offset parameter notified from the wireless cell A to the wireless terminal within the wireless cell A is referred to as "wireless quality offset parameter in the wireless cell A." If the wireless quality offset parameter in question is an offset parameter common to the target cells (Event A3 offset, HO Hysteresis, and the like), the wireless quality offset parameter includes one offset value. On the other hand, if the wireless quality offset parameter to be handled is an offset parameter specific to each target cell (CIO, Qoffset, and the like), the wireless quality offset parameter includes an offset value for each target cell.

In Step S100, the coverage control unit 13 selects a wireless cell to be controlled (controlled cell). For example, by referring to a wireless-cell identifier (ID) uniquely assigned to each wireless cell, a controlled cell is selected in either a descending order or an ascending order of such ID. In another example, the controlled cell may be selected in an order in which communication statistics quality such as abnormal termination rate or handover failure rate of calls for each wireless cell is lower, or in an order in which traffic load of each wireless cell is higher.

In Step S101, the UE measured information obtaining unit 10 obtains, from the wireless base station, UE measured information measured in the controlled cell and/or the wireless cell (peripheral cell) existing in the periphery of the control cell. An example is described taking the wireless communication network of FIG. 1 including the wireless parameter control apparatus. When taking the wireless cell 3-1 (hereinafter "controlled cell 3-1") as the controlled cell and the wireless cell 3-2 (hereinafter "peripheral cell 3-2") as the peripheral cell of the controlled cell, the UE measured information measured in the controlled cell 3-1 is obtained from the wireless base station 2-1, and the UE measured information measured in the peripheral cell 3-2 is obtained from the wireless base station 2-2. Note that the UE measured information measured in the controlled cell 3-1 is reported to the wireless base station 2-2, as a result of moving of the wireless terminal into the peripheral cell 3-2, the UE measured information measured in the controlled cell 3-1 may be obtained from the wireless base station 2-2. As described above, the UE measured information at least includes the wireless quality of each of the wireless cells 3-1 and 3-2 measured by the wireless terminals 4-1 through 4-5, examples of which are CPICH, RSCP, Ec/No, SINR for the WCDMA network and RSRP, RSRQ, SINR for the LTE network, and so on.

In Step S102, the coverage control unit 13 determines whether or not the condition of coverage change is satisfied for the controlled cell. For example, the condition of coverage change may be whether or not the traffic load of the control cell or of the peripheral cell is a predetermined value or above, or a predetermined value or below, whether or not the traffic load imbalance between the controlled cell and the peripheral cell is a predetermined value or above, whether or not the number of pieces of UE measured information obtained by the UE measured information obtaining unit 10 has reached a predetermined value, whether or not it has reached a predetermined time, and whether or not a predetermined time or above has passed since the former coverage control time, and the like. It is also possible to combine Step S100 and Step S102, to select only the wireless cells satisfying the condition of coverage change as a control cell. When the condition of coverage change is satisfied, the control proceeds to Step S103, and when the condition of coverage change is not satisfied, the wireless parameter control processing for the controlled cell is ended.

The processing from Step S103 through Step S106 is for processing for each candidate value of the wireless quality offset parameter of the controlled cell.

In Step S104 and Step S105, the processing is performed assuming change of the wireless quality offset parameter of the controlled cell to the candidate value. Note that "assuming change of the wireless quality offset parameter" means to virtually change the wireless quality offset parameter of the wireless cell without actually changing that wireless quality offset parameter (without changing in the real world). Therefore, changing the wireless quality offset parameter inside various types of computer programs such as a system level simulator or a radio wave propagation simulator is included in "assuming change of the wireless quality offset parameter."

It should be noted that in the processing from Step S103 through Step S106, not only the change of the wireless quality offset parameter of the control cell but also the change of the wireless quality offset parameter of a peripheral cell may simultaneously be assumed. Specifically, the change of the coverage of the peripheral cell X with respect to the controlled cell and the change of the coverage of the controlled cell with respect to the peripheral cell X are brought to be a set. For example, if −2 dB is assumed to be the offset value from the controlled cell to the peripheral cell X, the coverage of the peripheral cell X with respect to the controlled cell is narrowed by 2 dB. In such a case, the offset value from the peripheral cell X to the controlled cell is set to be +2 dB, and the coverage of the controlled cell with respect to the peripheral cell X is set to be wider by 2 dB. By doing so, it becomes possible to control the coverage of the controlled cell without causing any contradiction for the coverage relation between two wireless cells.

In addition, if the wireless quality offset parameter is an offset parameter specific to each target cell, the candidate value (offset candidate value) of the wireless quality offset parameter is set for each target cell, and the processing from Step S103 through Step S106 is performed to the combination of the offset candidate values. For example, consider a case in which the wireless cell A and the wireless cell B exist as target cells, and the offset candidate values of the wireless cell A are −2 dB and +2 dB, and the offset candidate values of the wireless cell B are −3 dB, 0 dB, and +3 dB. In this case, there are a total of six patterns for the combination of the offset candidate values, namely, (−2 dB, −3 dB), (−2 dB, 0 dB), (−2 dB, +3 dB), (+2 dB, −3 dB), (+2 dB, 0 dB), (+2 dB, +3 dB). Therefore, for the combination of the total of six patterns of the offset candidate values, the processing from Step S103 through Step S106 is performed. Note that it is not always necessary to perform the processing from Step S103 through Step S106 for all the combinations of offset candidate values; it is also possible to perform the processing from Step S103 through Step S106 by selecting only a specific combination.

On the other hand, when the wireless quality offset parameter is an offset parameter common to the target cells, and its candidate values are −2 dB, 0 dB, and +2 dB, the processing from Step S103 through Step S106 is performed for the total of three patterns of offset candidate values: −2 dB, 0 dB, and +2 dB. Note that it is not always necessary to perform the processing from Step S103 through Step S106 for all the offset candidate values; it is also possible to perform the processing from Step S103 through Step S106 by selecting only a specific offset candidate value.

In Step S104, the serving cell predicting unit 11 predicts a serving cell of each wireless terminal under assumption that the wireless quality offset parameter is changed to the candidate value. If the UE measured information includes a wireless quality for each wireless cell, the serving cell for each wireless terminal assuming that the wireless quality offset parameter is changed to the candidate value can be predicted in the following method.

First, among the UE measured information obtained by the UE measured information obtaining unit 10, the UE measured information of the wireless terminal whose serving cell is the controlled cell is extracted. Then, for each piece of the UE measured information, the candidate value (offset candidate value) of the wireless quality offset parameter is added to the wireless quality of each wireless cell excluding the controlled cell included in that UE measured information. Then, among the wireless quality of each wireless cell after adding thereto the offset candidate value, the wireless cell having the highest wireless quality is predicted as a serving cell for that UE measured information. Here, when the wireless quality offset parameter is an offset parameter common to the target cells (for example, Event A3 offset, HO Hysteresis, and the like), a common offset candidate value is added to the wireless quality of each wireless cell excluding the controlled cell. Note that instead of adding a common offset candidate value to the wireless quality of each wireless cell excluding the controlled cell, the candidate value of the offset parameter common to the target cells may be added to or subtracted from the wireless quality of the controlled cell. On the other hand, when the wireless quality offset parameter is an offset parameter specific to each target cell (for example, CIO, Qoffset and the like), a separate offset candidate value is added to each wireless cell excluding the controlled cell. For example, assume a case in which the UE measured information for the wireless terminal is (P0, P1, P2 . . . , Pn). Here, Pi (i=0–n; n is a natural number) represents a received power (unit: dBm) of the wireless cell Ci (i=0–n; n is a natural number). In addition, assume a case in which the wireless cell C0 is the controlled cell. When the wireless quality offset parameter is the offset parameter common to the target cells, the received power (P'0, P'1, P'2, . . . , P'n) after adding thereto the offset candidate value is predicted as:

$$(P'0, P'1, P'2, \ldots, P'n) = (P0, P1+\Delta, P2+\Delta, \ldots, Pn+\Delta) \quad \text{[Expression 1]}$$

Here Δ is a candidate value of the offset parameter common to the target cells. On the other hand, when the wireless quality offset parameter is an offset parameter specific to each target cell, the received power (P'0, P'1, P'2, ..., P'n) after adding thereto the offset candidate value is predicted as:

(P'0,P'1,P'2, ... ,P'n)=(P0,P1+Δ1,P2+Δ2, ... ,Pn+Δn)  [Expression 2]

Here, Δi is a candidate value of the offset parameter specific to each target cell.

In Step S105, the communication speed index predicting unit 12 predicts the communication speed index such as throughput of each wireless terminal, in case where the wireless quality offset parameter is changed to the candidate value. The throughput of each wireless terminal can be obtained by predicting the wireless quality (for example SINR) of each wireless terminal. For example, for a certain wireless terminal, the received power before adding thereto the offset candidate value is assumed to be (P0, P1, P2 ..., Pn) and the received power after adding thereto the offset candidate value is assumed to be (P'0, P'1, P'2 ..., P'n) (the unit here is assumed to be mW). As described above, the serving cell predicting unit 11 predicts, as the serving cell, the wireless cell having the highest received power among (P'0, P'1, P'2 ..., P'n). Here, assume a case in which the wireless cell C0 is predicted as the serving cell. In this case, the SINR of the wireless terminal is predicted as:

$$SINR = \frac{P0}{\sum_{i=1}^{n} Pi \cdot Ui + \text{NOISE}}$$  [Expression 3]

Here, Ui represents the traffic load of the wireless cell Ci (For example PRB utilization rate) and takes a value of 0 or above and 1 or below. NOISE represents a thermal noise.

The traffic load of the wireless cell Ci can be assumed to be a predetermined traffic load. For example, Ui is assumed to be Ui=1 so as to predict SINR under the condition in which the traffic load is extremely high. Alternatively, for predicting the SINR under the condition in which the traffic load is about the intermediate level, Ui is assumed to be Ui=0.5. For predicting the throughput from the SINR, using the experimentally or logically derived correspondence relation between the SINR and the throughput (for example, the correspondence table for SINR and throughput or Shannon formula), and the maximum throughput under such SINR is predicted. Then, by dividing the maximum throughput by the number of UEs of the serving cell, the throughput of the wireless terminal is predicted. Here, the number of UEs of the serving cell is preferably the predicted value under the assumption that the wireless quality offset parameter is changed to the candidate value can be predicted. For example, by adding up the serving cells of each wireless terminal predicted in Step S104, the number of UEs for each cell under the assumption that the wireless quality offset parameter is changed to the candidate value. Note that as shown in Expression 3, it is preferable to use the received power before adding thereto the offset candidate value as the received power for each wireless cell used for calculating the SINR. This is because the wireless quality offset parameter is an offset virtually added to the received power, and it is not that the actual received power of the wireless terminal changes. Note that the wireless terminal for which the throughput is predicted may be all the wireless terminals existing in the controlled cell and the peripheral cells, or may be a part of the wireless terminals existing in the controlled cell and the peripheral cells. In addition, the wireless terminal for which the throughput is predicted may be only the wireless terminals existing in the controlled cell or only the wireless terminals existing in the peripheral cells.

In Step S107, the coverage control unit 13 calculates the evaluation value of the communication speed index from the communication speed index of each wireless terminal obtained for each offset candidate value. Then, the coverage of the controlled cell is controlled based on the evaluation value of the communication speed index calculated for each offset candidate value. Examples of the evaluation value of the communication speed index are the communication speed index's mean value, standard deviation value, median, minimum value, maximum value, the lower X % value (for example lower 5% value, 10% value, 50% value, 90% value, 95% value) of the Cumulative Distribution Function (CDF), the ratio of wireless terminals at which the communication speed index is a predetermined value or lower, the ratio of wireless terminals at which the communication speed index is a predetermined value or higher, and a combination of two or more of these indices.

The following methods can be considered to control the coverage.

1. The coverage of the controlled cell is changed by changing the wireless quality offset parameter of the controlled cell. For example, the offset candidate value at which the evaluation value of the communication speed index is optimal or at which the evaluation value of the communication speed index improves from the current situation is selected, and the wireless quality offset parameter of the controlled cell is changed to that offset candidate value. Alternatively, the offset candidate value at which the evaluation value of the communication speed index is optimal or at which the evaluation value of the communication speed index improves from the current situation is selected, and the wireless quality offset parameter of the controlled cell is brought to be close to that offset candidate value by a predetermined amount.

2. The offset candidate value at which the evaluation value of the communication speed index improves from the current situation is obtained. Then, the control in the same direction as the direction of coverage control (to enlarge or reduce the coverage) realized by applying the offset candidate value to the controlled cell is realized, by changing the wireless quality offset parameter different from the wireless quality offset parameter used in Step S103 through Step S106. Assume an example in which, in Step S103 through Step S106, as a result of predicting the communication speed index of the wireless terminal for each candidate value of the offset parameter common to the target cells (for example, Event A3 offset), the evaluation value of the communication speed index was predicted to improve the most when the offset parameter common to the target cells (for example, Event A3 offset) is −2 dB. In this case, the instead of changing the offset parameter common to the target cells (for example, Event A3 offset) to −2 dB for the controlled cell, the offset parameter specific to each target cell (for example CIO) may be set to −2 dB for all the target cells.

3. The offset candidate value at which the evaluation value of the communication speed index improves from the current situation is obtained. The control in the same direction as the direction of coverage control (to enlarge or reduce the coverage) realized by applying the offset candidate value to the controlled cell is realized by changing a wireless parameter other than the wireless quality offset parameter. For example, if the offset candidate value at which the evaluation value of the communication speed index improves the most is the value in the direction to reduce the coverage of the controlled cell, the transmission power of the controlled cell is reduced by a predetermined amount (for example 1 dB) or the tilt angle of the controlled cell is reduced (down-tilting) by a predetermined amount (for example 1 degree), thereby reducing the coverage of the controlled cell. Conversely, if the offset candidate value at which the evaluation value of the communication speed index improves the most is the value in the direction to enlarge the coverage of the controlled cell, the transmission power of the controlled cell is increased by a predetermined amount (for example 1 dB) or the tilt angle of the controlled cell is increased (up-tilting) by a predetermined amount (for example 1 degree), thereby enlarging the coverage of the controlled cell.

Note that the coverage control unit 13 does not always have to change the coverage of the controlled cell. For example, the coverage may be changed only if the difference between the offset candidate value at which the evaluation value of the communication speed index improves the most and the offset value set to the controlled cell at that time is a predetermined value or more, or if the difference between the optimal value of the evaluation value of the communication speed index and the evaluation value of the communication speed index at that time is a predetermined value or more. In addition, the wireless cell whose coverage is controlled does not have to be a controlled cell. For example, such methods can be taken as, instead of enlarging the coverage of a controlled cell, the coverage of a peripheral cell around the controlled cell may be reduced; or instead of reducing the coverage of a controlled cell, the coverage of a peripheral cell around the controlled cell may be enlarged. Alternatively, the coverage of both of the controlled cell and the peripheral cell may be changed.

Note that in the present exemplary example, the communication speed index of the wireless terminal that would result under assumption that the wireless quality offset parameter is changed is predicted using the UE measured information; however the present invention is not limited to this. For example, instead of obtaining the UE measured information from a wireless terminal, it is also possible to generate pseudo-UE-measured-information at each location in the cell using the radio wave propagation simulator and map information.

As described above, the wireless parameter control apparatus 1 according to the present exemplary embodiment controls the coverage of the wireless cell so as to improve the evaluation value of the communication speed index by predicting the serving cell and the communication speed index of each wireless terminal under the assumption that the wireless quality offset parameter of the controlled cell is changed. Therefore, according to the present exemplary embodiment, the coverage of the wireless cell can be controlled so as to improve the throughput of the wireless terminal.

The Second Exemplary Embodiment

The second exemplary embodiment to practice the present invention is detailed with reference to the drawings.

Figure 4:
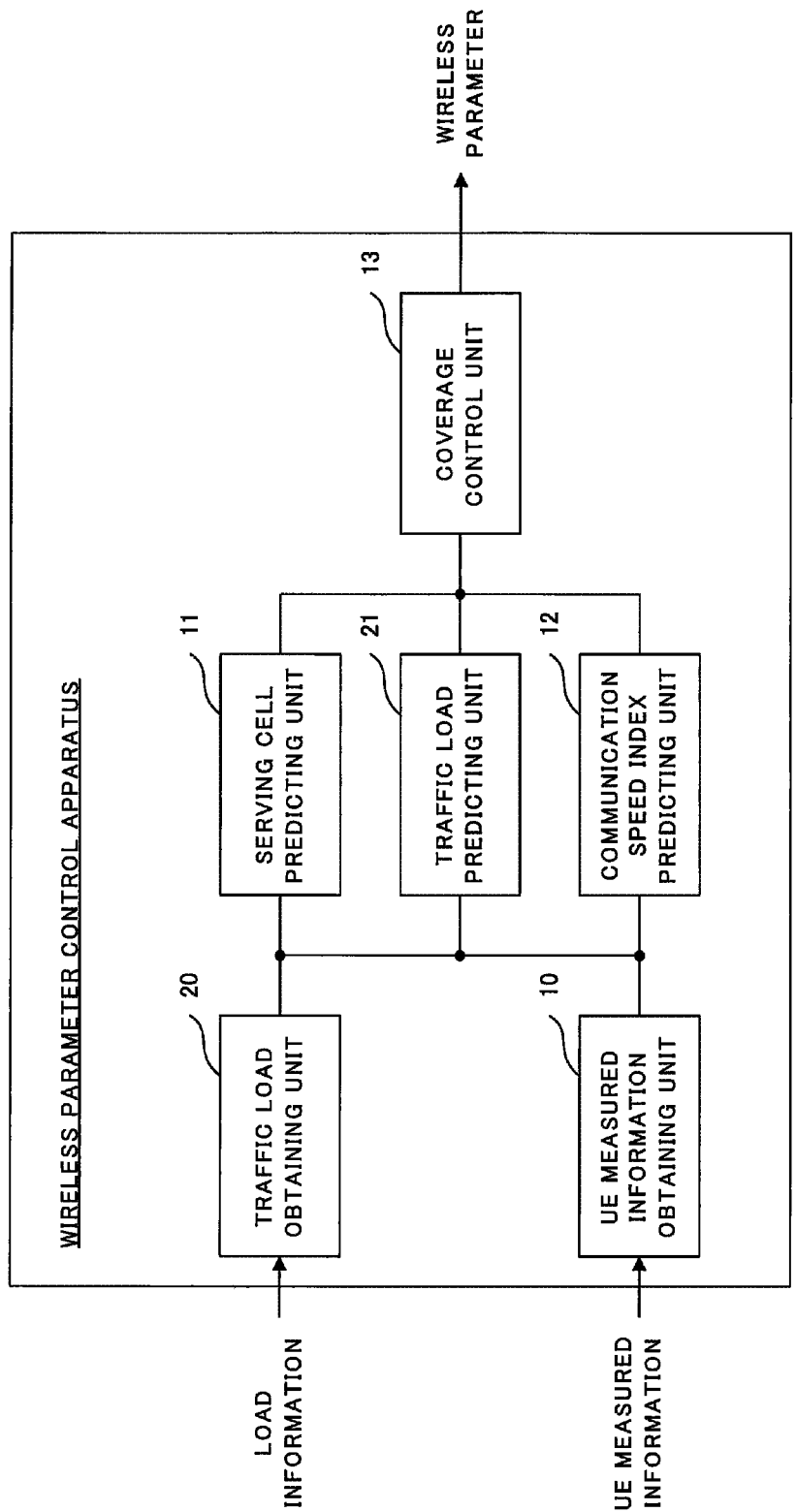
FIG. 4 is a block diagram showing an example of a configuration of the wireless parameter control apparatus according to the second exemplary embodiment of the present invention.

FIG. 4 is a diagram showing an example of a configuration of the wireless parameter control apparatus 1 according to the present exemplary embodiment. The wireless parameter control apparatus 1 according to the present exemplary embodiment is different from the wireless parameter control apparatus 1 according to the first exemplary embodiment of the present invention, in including a traffic load obtaining unit 20 being a second obtaining unit and a traffic load predicting unit 21 being a third predicting unit.

The traffic load obtaining unit 20 obtains a traffic load of each wireless cell measured in the wireless base station. For example, an average of the traffic load for each predetermined period (5 minutes, 10 minutes, 30 minutes and the like) is obtained. An example of the traffic load is a resource utilization rate; specifically, some examples are PRB (Physical Resource Block) utilization rate and the ratio of the used transmission power to the maximum transmission power. As information to represent the traffic load, information concerning the number of UEs such as the number of simultaneously communicating UEs and the number of active UEs may be obtained.

The traffic load predicting unit 21 predicts the traffic load of each wireless cell under the assumption that the wireless quality offset parameter of the wireless cell is changed. The details of a method to predict a traffic load are described later.

Figure 5:
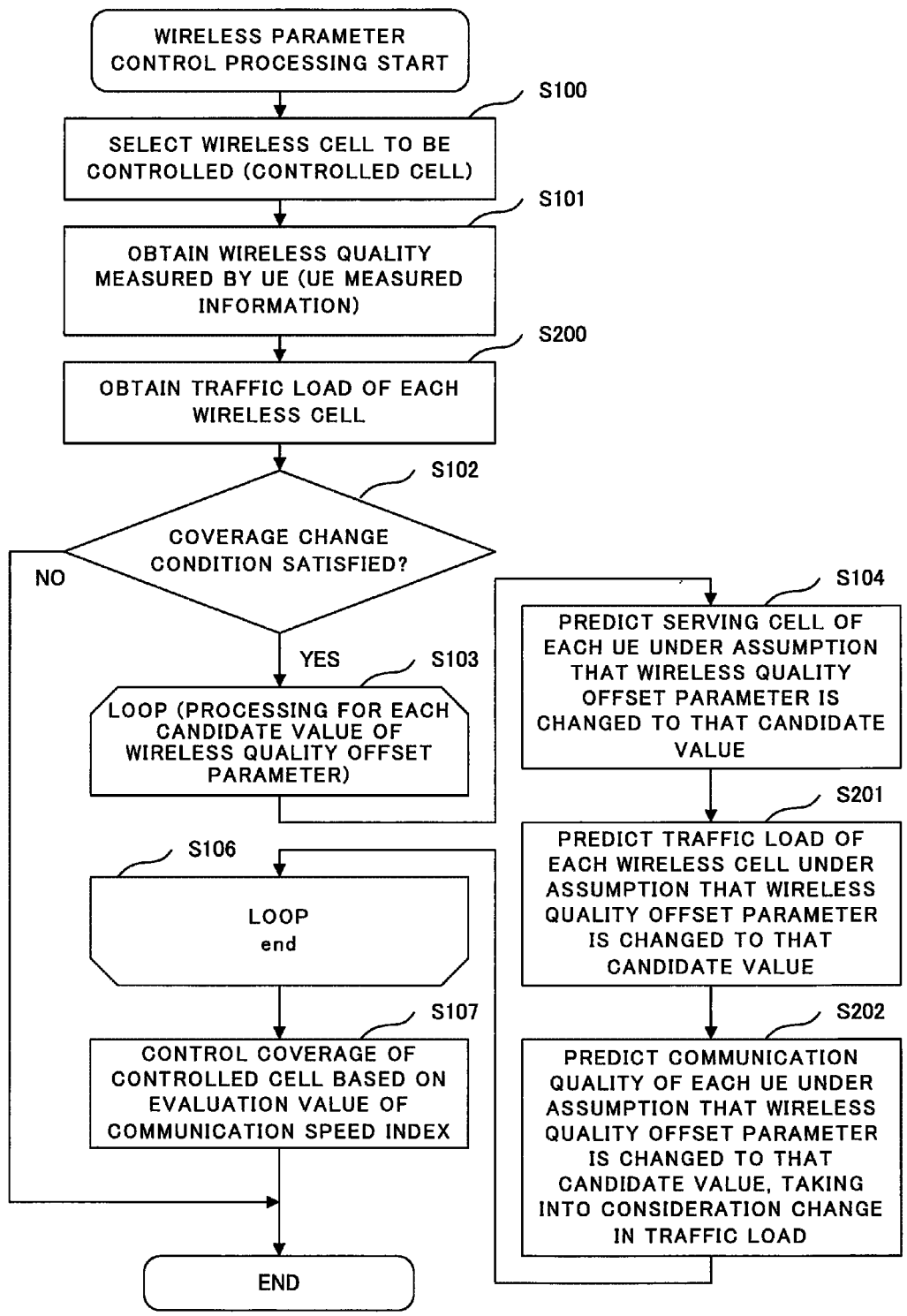
FIG. 5 is a flowchart showing an example of wireless parameter control processing performed by the wireless parameter control apparatus according to the second exemplary embodiment of the present invention.

The following describes a specific example of the wireless parameter control processing performed by the wireless parameter control apparatus 1 according to the second exemplary embodiment, with reference to the flowchart of FIG. 5. The differences from the wireless parameter control processing of the first exemplary embodiment shown in FIG. 3 are that it includes the processing to obtain the traffic load of each wireless cell performed by the traffic load obtaining unit 20 (Step S200), the processing to predict the traffic load of each wireless cell under the assumption that the wireless quality offset parameter of the controlled cell is changed, which is performed by the traffic load predicting unit 21 (Step S201), and the processing to predict the communication speed index using the prediction result of the traffic load, which is performed by the communication speed index predicting unit 12 (Step S202).

In Step S200, the traffic load obtaining unit 20 obtains the traffic load for each period (5 minutes, 10 minutes, 30 minutes and the like). For example, the average PRB utilization rate for the last five minutes for each wireless cell is obtained.

In Step S201, the traffic load predicting unit 21 predicts the traffic load of each wireless cell under the assumption that the wireless quality offset parameter of the controlled cell is changed to a predetermined candidate value. The traffic load (U'i) of the wireless cell Ci under the assumption that the wireless quality offset parameter of the controlled cell is changed to a predetermined candidate value can be obtained as $U'i=Ui*Ri$ by multiplying the change rate (Ri) of the number of UEs in the wireless cell Ci resulting from changing the wireless quality offset parameter of the controlled cell with respect to the traffic load (Ui) of the wireless cell Ci at that time (i.e., before changing the wireless quality offset parameter of the controlled cell).

Here, the number of UEs in the wireless cell Ci at that time (i.e., before changing the wireless quality offset parameter of the controlled cell) can be obtained as the number of UEs whose serving cell is the wireless cell Ci, from the UE measured information obtained by the UE measured information obtaining unit 10. The number of UEs in the wireless cell Ci under the assumption that the wireless quality offset parameter of the controlled cell is changed can be obtained as the number of UEs whose serving cell is the wireless cell Ci, by using the prediction result of the serving cell for each piece of the UE measured information performed by the serving cell predicting unit 11.

In Step S202, the communication speed index predicting unit 12 predicts the communication speed index of each wireless terminal under the assumption that the wireless quality offset parameter of the controlled cell is changed to a predetermined candidate value, taking into consideration the change in traffic load of each wireless cell. For example, the SINR of each wireless terminal is predicted as:

$$SINR = \frac{P0}{\sum_{i=1}^{n} Pi \cdot U'i + \text{NOISE}}$$ [Expression 4]

Here, U'i is a traffic load of the wireless cell Ci under the assumption that the wireless quality offset parameter is changed to a predetermined candidate value. The method of predicting the communication speed index from the SINR is the same as that in the first exemplary embodiment of the present invention, and so its explanation is omitted.

As described above, the wireless parameter control apparatus 1 according to the present exemplary embodiment predicts the communication speed index (throughput) of each wireless terminal, taking into consideration the change in traffic load of each wireless cell which would result by changing the wireless quality offset parameter of the controlled cell. Therefore, according to the present exemplary embodiment, the coverage of a wireless cell can be controlled by predicting the throughput of the wireless terminal with high accuracy.

The Third Exemplary Embodiment

The third exemplary embodiment to practice the present invention is detailed with reference to the drawings.

The wireless parameter control apparatus 1 according to the present exemplary embodiment is different from the first and second exemplary embodiments of the present invention, in that it predicts the communication speed index of the wireless terminal by assuming not only change in the wireless quality offset parameter but also change in both of the wireless quality offset parameter and the transmission power.

The configuration of the wireless parameter control apparatus 1 according to the present exemplary embodiment is omitted because it is the same as those in the first and second exemplary embodiments of the present invention.

Figure 6:
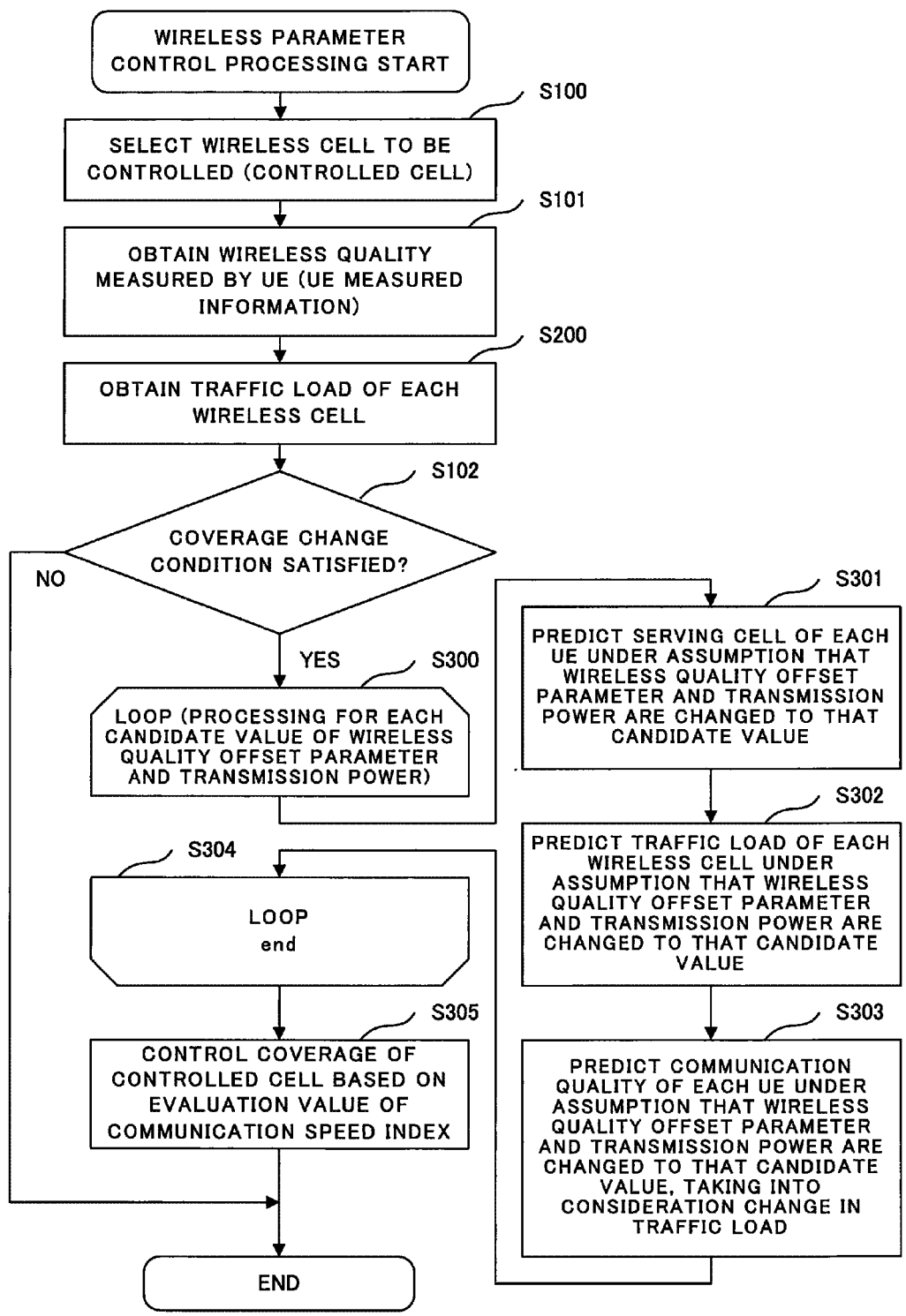
FIG. 6 is a flowchart showing an example of wireless parameter control processing performed by the wireless parameter control apparatus according to the third exemplary embodiment of the present invention.

Next, a specific example of the wireless parameter control processing according to the wireless parameter control apparatus 1 according to the third exemplary embodiment is described with reference to the flowchart of FIG. 6. Note that although the present exemplary embodiment can be combined with any of the first exemplary embodiment and the second exemplary embodiment, the following explains an example in which the present exemplary embodiment is combined with the second exemplary embodiment shown in FIG. 5. The difference of the present exemplary embodiment from the second exemplary embodiment is that in Step S300 through Step S304, change to a candidate value is assumed for not only the wireless quality offset parameter but also the transmission power, in predicting the serving cell of each wireless terminal, the traffic load of each wireless cell, and the communication speed index of each wireless terminal, and that in Step S305, the coverage of the controlled cell is controlled based on the communication speed index for each wireless terminal predicted for each candidate values for the wireless quality offset parameter and transmission power.

The following description takes an example in which the Event A3 offset being the offset parameter common to the target cells is used as the wireless quality offset parameter. When the candidate value for the Event A3 offset of the controlled cell is −3 dB, 0 dB, and +3 dB, and the candidate value for the transmission power of the controlled cell is 36 dBm, 33 dBm, and 30 dBm, there are a total of the following nine patterns of combinations of the candidate values for the wireless quality offset parameter and the transmission power: (−3 dB, 36 dBm), (−3 dB, 33 dBm), (−3 dB, 30 dBm), (0 dB, 36 dBm), (0 dB, 33 dBm), (0 dB, 30 dBm), (+3 dB, 36 dBm), (+3 dB, 33 dBm), (+3 dB, 30 dBm). In this case, from Step S301 through Step S303, the serving cell for each wireless terminal, the traffic load for each wireless cell, and the communication speed index of each wireless terminal are predicted for the total of nine patterns of candidate values. Note that it is not always necessary to predict the serving cell for each wireless terminal, the traffic load for each wireless cell, and the communication speed index of each wireless terminal, for all the combinations of candidate values of the wireless quality offset parameter and the transmission power. It is possible to use only a part of the combinations of candidate values of the wireless quality offset parameter and the transmission power. In such a case, the serving cell for each wireless terminal, the traffic load for each wireless cell, and the communication speed index of each wireless terminal are predicted for the selected combination of candidate values.

For example, assume a case in which the UE measured information for a certain wireless terminal is (P0, P1, P2, ..., Pn). Here, Pi (i=0−n; n is a natural number) represents a received power (unit: dBm) of the wireless cell Ci (i=0−n; n is a natural number). In addition, assume a case in which the wireless cell C0 is the controlled cell, and the set value of the current transmission power of the controlled cell is 36 dBm, and the set value of the Event A3 offset is 0 dB. Under the assumption that the Event A3 offset of the controlled cell is changed to +3 dB and that the transmission power of the controlled cell is changed to 30 dBm, the received power (P'0, P'1, P'2, ..., P'n) of the wireless terminal can be predicted as:

(P'0,P'1,P'2, ... ,P'n)=(P0−(36−30),P1+3, P2+3, ... ,Pn+3)  [Expression 5]

In Step 301, the serving cell predicting unit 11 predicts, as the serving cell, the wireless cell having the highest received power, among (P'0, P'1, P'2, ..., P'n). Here, assume as an example a case in which the wireless cell C0 is predicted as the serving cell. In this case, the SINR of the wireless terminal can be predicted as:

$$SINR = \frac{P'0}{\sum_{i=1}^{n} Pi \cdot U'i + \text{NOISE}}$$ [Expression 6]

The wireless quality offset parameter is an offset virtually added to the received power and it is not that the actual received power is increased or decreased, whereas the change of transmission power affects the actual received power. Therefore, in calculating the SINR, the offset value of the wireless quality offset parameter is not taken into consideration, whereas the change of transmission power is taken into consideration. In other words, in this example, a predicted value after the change of transmission power is used as the received power of the wireless cell C0 being the controlled cell. On the other hand, the original received power not added with the offset candidate value is used for any wireless cell other than the controlled cell. The traffic load prediction method and the method for predicting the communication speed index from the SINR are similar to those in the second exemplary embodiment of the present invention, and so are omitted here. In Step S305, the coverage of the controlled cell is controlled based on the predicted communication speed index of each wireless terminal for each candidate values of the wireless quality offset parameter and transmission power. For example, the wireless quality offset parameter and the transmission power of the controlled cell are changed to the candidate value for the wireless quality offset parameter and the candidate value for the transmission power, at which the evaluation value of the communication speed index improves the most. Needless to say, the other control methods of coverage as shown in the first exemplary embodiment can also be used.

As described above, the wireless parameter control apparatus 1 according to the present exemplary embodiment predicts the communication speed index of each wireless terminal under assumption that the wireless quality offset parameter and the transmission power of the controlled cell are changed. Therefore, according to the present exemplary embodiment, the coverage of the wireless cell can be optimized using both of the wireless quality offset parameter and the transmission power.

The Fourth Exemplary Embodiment

Figure 7:
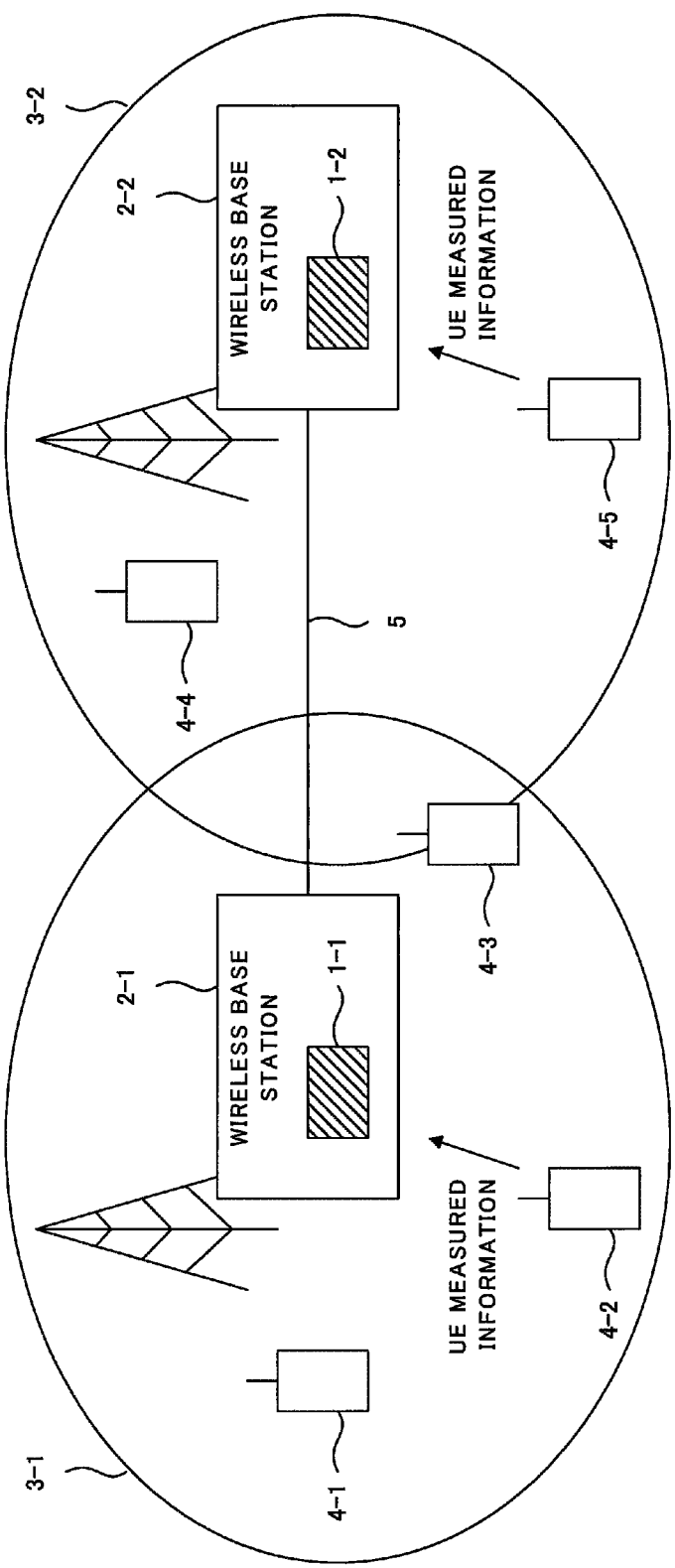
FIG. 7 is a diagram showing an example of a configuration of a wireless communication network including a wireless parameter control apparatus according to the fourth exemplary embodiment of the present invention.

FIG. 7 is a diagram showing an example of a configuration of a wireless communication network including a wireless parameter control apparatus 1 according to the fourth exemplary embodiment of the present invention. The difference from the example of the configuration of the wireless communication network according to the first exemplary embodiment shown in FIG. 1 is that the wireless parameter control apparatuses 1-1 and 1-2 are respectively provided as a part of the wireless base stations 2-1 and 2-1. The wireless base stations 2-1 and 2-1 are connected to each other by a wireless or wired communication line 5. Note that the wireless base stations 2-1 and 2-1 do not have to be connected directly by the communication line 5, and may be connected indirectly via a hosting network (not shown in the drawings) for example. Each wireless base station may exchange, with other wireless base stations, a part or all of the UE measured information and the traffic load information. In addition, the determined wireless parameter (for example, wireless quality offset parameter, transmission power, and tilt angle) may be notified to other wireless base stations, or other wireless base stations may be instructed to change the wireless parameter (for example, wireless quality offset parameter, transmission power, and tilt angle).

The configuration and operation of the wireless parameter control apparatuses 1-1, 1-2 are the same as those in the first to third exemplary embodiments, and so omitted in the following.

As described above, the wireless parameter control apparatus 1 according to the present exemplary embodiment is realized as a part of the function of the wireless base station. Therefore, no central control server, which centrally controls the wireless parameters of a plurality of wireless cells, is necessary, which makes it possible to control the coverage of each wireless cell in an autonomous-distributed manner.

In the above, each exemplary embodiment of the present invention has been described. Note that the UE measured information obtaining unit 10, the serving cell predicting unit 11, the communication speed index predicting unit 12, the coverage control unit 13, the traffic load obtaining unit 20, and the traffic load predicting unit 21 in the wireless parameter control apparatus in FIG. 1, FIG. 4 and FIG. 7 may be configured either by hardware, by software, or by hardware and software.

If the UE measured information obtaining unit 10, the serving cell predicting unit 11, the communication speed index predicting unit 12, the coverage control unit 13, the traffic load obtaining unit 20, and the traffic load predicting unit 21 in the wireless parameter control apparatus are constituted by hardware, they will be configured by a UE measured information obtaining device, a serving cell predictor, a communication speed index predictor, a coverage controller 13, a traffic load obtaining device, a traffic load predictor. When configuring by hardware, a part or all of the UE measured information obtaining unit 10, the serving cell predicting unit 11, the communication speed index predicting unit 12, the coverage control unit 13, the traffic load obtaining unit 20, and the traffic load predicting unit 21 in the wireless parameter control apparatus may be configured for example by an electronic circuit. An example of the electronic circuit is an integrated circuit (IC) such as LSI (Large Scale Integrated circuit), ASIC (Application Specific Integrated Circuit), a gate array, FPGA (Field Programmable Gate Array).

A part or all of the functions of each unit of the UE measured information obtaining unit 10, the serving cell predicting unit 11, the communication speed index predicting unit 12, the coverage control unit 13, the traffic load obtaining unit 20, and the traffic load predicting unit 21 in the wireless parameter control apparatus may also be realized by a computer reading a program realizing such function from a computer-readable recording medium such as a CD-ROM, a DVD, and a flash memory.

For example, a computer as the wireless parameter control apparatus may be configured by a storing unit such as a hard disk and a ROM storing therein a program, a display unit such as a liquid crystal display, a DRAM, a CPU for storing data necessary for arithmetic operations, a transmission and reception unit for performing transmission and reception with a base station, and a bus for connecting each unit. The function of the wireless parameter control apparatus according to the present exemplary embodiment can be realized by a program by describing the operation of each unit shown in FIG. 3, FIG. 5 and FIG. 6 by a program, storing this program in the storage unit such as a ROM, storing the information necessary for the arithmetic operations in a DRAM, and operating this program by a CPU.

In the above, representative exemplary embodiments of the present invention have been respectively described. However, the present invention can be practiced in other various forms without departing from its spirit and major characteristics defined by the claims of the present invention. In view of this, the above-described respective exemplary embodiments are mere examples, and should not be construed in a limited sense. The scope of the present invention is to be shown by the claims and not bound by how it is described in the description or the abstract. Furthermore, any modification and alteration belonging to the scope of equivalents of the claims are included in the scope of the present invention.

The present invention claims all the interests pertaining to the priority based on Japanese Patent Application No. 2013-168122 filed on Aug. 13, 2013. The content of Japanese Patent Application No. 2013-168122 is incorporated in the content of the description of the present invention.

A part or all of the above-described exemplary embodiments can be described as in the following Supplementary Note but not limited to the configuration of the following Supplementary Note.

(Supplementary Note 1)

A wireless parameter control apparatus in a wireless communication system in which a wireless cell which is connected to by a wireless terminal can be controlled by adding an offset value to a wireless quality of each wireless cell measured by the wireless terminal, including:

a first predicting unit for predicting a wireless cell which is connected to by a first wireless terminal in a first wireless cell upon assuming that an offset value to be added to a wireless quality of each wireless cell measured by the first wireless terminal is changed to a predetermined candidate value;

a second predicting unit for predicting at least one communication speed index of a communication speed index of the first wireless terminal and a communication speed index of a second wireless terminal in a second wireless cell existing around the first wireless cell upon assuming that the offset value is changed to the predetermined candidate value; and a control unit for controlling at least one coverage of coverage of the first wireless cell and coverage of the second wireless cell based on a prediction result of the communication speed index.

(Supplementary Note 2)

The wireless parameter control apparatus according to Supplementary Note 1, characterized by including:

a first obtaining unit for obtaining a wireless quality of each wireless cell measured by a wireless terminal, wherein the second predicting unit predicts the at least one communication speed index upon assuming that the offset value is changed to the predetermined candidate value, using a measurement result of a wireless quality of each wireless cell measured by the first or the second wireless terminal.

(Supplementary Note 3)

The wireless parameter control apparatus according to Supplementary Note 1 or Supplementary Note 2, characterized in that the control unit calculates an evaluation value of the communication speed index for each of the candidate values, using a prediction result of the communication speed index predicted for each of the candidate values, and controls the at least one coverage so as to improve the evaluation value of the communication speed index.

(Supplementary Note 4)

The wireless parameter control apparatus according to Supplementary Note 3, characterized in that:

the evaluation value of the communication speed index is calculated by using at least one of a mean value, a standard deviation value, a median, a minimum value, a maximum value of a communication speed index, a lower X % value of a cumulative distribution function, a ratio of wireless terminals at which the communication speed index is a predetermined value or below, and a ratio of wireless terminals at which the communication speed index is a predetermined value or above.

(Supplementary Note 5)

The wireless parameter control apparatus according to any one of Supplementary Notes 1 to 4, characterized in comprising:

a second obtaining unit for obtaining a traffic load for each wireless cell; and a third predicting unit for predicting a traffic load for each wireless cell upon assuming that the offset value is changed to the predetermined candidate value, wherein the second predicting unit predicts the at least one communication speed index upon assuming that the offset value is changed to the predetermined candidate value by using a prediction result of the traffic load.

(Supplementary Note 6)

The wireless parameter control apparatus according to any one of Supplementary Notes 1 to 5, characterized in that:

the second predicting unit predicts the at least one communication speed index upon assuming that a transmission power of the first wireless cell is changed to a predetermined transmission-power-candidate-value in addition to the offset value.

(Supplementary Note 7)

The wireless parameter control apparatus according to any one of Supplementary Notes 4 to 6, characterized in that:

the control unit controls the coverage of the first wireless cell by determining the offset value based on the evaluation value of the communication speed index and changing the offset value to the determined offset value.

(Supplementary Note 8)

The wireless parameter control apparatus according to any one of Supplementary Notes 4 to 6, characterized in that:

the control unit controls the coverage of the first wireless cell by determining the offset value based on the evaluation value of the communication speed index and bringing the offset value close to the determined offset value.

(Supplementary Note 9)

The wireless parameter control apparatus according to any one of Supplementary Notes 4 to 6, characterized in that:

the control unit determines a control direction of the coverage of the first wireless cell based on the evaluation value of the communication speed index and controls the coverage of the first wireless cell in the determined control direction using at least one of a transmission power and an antenna tilt angle.

(Supplementary Note 10)

The wireless parameter control apparatus according to any one of Supplementary Notes 1 to 9, characterized in comprising:

at least one of the second wireless cells different from the first wireless cell, wherein the offset value is a parameter that can be set to a different value for each of the second wireless cells.

(Supplementary Note 11)

The wireless parameter control apparatus according to any one of Supplementary Notes 1 to 9, characterized in comprising:

at least one of the second wireless cells different from the first wireless cell, wherein the offset value is a parameter whose value is common to the second wireless cells.

(Supplementary Note 12)

The wireless parameter control apparatus according to any one of Supplementary Notes 1 to 11, characterized in that:

the wireless quality at least includes a received power or a received quality of a reference signal or a pilot channel.

(Supplementary Note 13)

The wireless parameter control apparatus according to any one of Supplementary Notes 1 to 12, characterized in that:

the communication speed index is a throughput.

(Supplementary Note 14)

A wireless communication system comprising:

the wireless parameter control apparatus according to any one of Supplementary Notes 1 to 13;

a plurality of wireless base stations connected to the wireless parameter control apparatus; and a plurality of wireless terminals each of which is connected to at least one of the plurality of wireless base stations.

(Supplementary Note 15)

A wireless base station comprising the wireless parameter control apparatus according to any one of Supplementary Notes 1 to 13.

(Supplementary Note 16)

A wireless parameter control method for a wireless parameter control apparatus in a wireless communication system in which a wireless cell which is connected to by a wireless terminal can be controlled by adding an offset value to a wireless quality of each wireless cell measured by the wireless terminal, comprising:

predicting a wireless cell which is connected to by a first wireless terminal in a first wireless cell upon assuming that an offset value to be added to a wireless quality of each wireless cell measured by the first wireless terminal is changed to a predetermined candidate value;

predicting at least one communication speed index of a communication speed index of the first wireless terminal and a communication speed index of a second wireless terminal in a second wireless cell existing around the first wireless cell upon assuming that the offset value is changed to the predetermined candidate value; and controlling at least one coverage of coverage of the first wireless cell and coverage of the second wireless cell based on a prediction result of the communication speed index.

(Supplementary Note 17)

The wireless parameter control method according to Supplementary Note 16, characterized by including:

obtaining a wireless quality of each wireless cell measured by the wireless terminal, wherein the predicting the communication speed index predicts the at least one communication speed index upon assuming that the offset value is changed to the predetermined candidate value, using a measurement result of a wireless quality of each wireless cell measured by the first or the second wireless terminal.

(Supplementary Note 18)

The wireless parameter control method according to Supplementary Note 16 or Supplementary Note 17, characterized in that the controlling the coverage calculates an evaluation value of the communication speed index for each of the candidate values, using a prediction result of the communication speed index predicted for each of the candidate values, and controls the at least one coverage so as to improve the evaluation value of the communication speed index.

(Supplementary Note 19)

The wireless parameter control method according to Supplementary Note 18, characterized in that:

the evaluation value of the communication speed index is calculated by using at least one of a mean value, a standard deviation value, a median, a minimum value, a maximum value of a communication speed index, a lower X % value of a cumulative distribution function, a ratio of wireless terminals at which the communication speed index is a predetermined value or below, and a ratio of wireless terminals at which the communication speed index is a predetermined value or above.

(Supplementary Note 20)

The wireless parameter control method according to any one of Supplementary Notes 16 to 19, characterized in comprising:

obtaining a traffic load for each wireless cell; and predicting a traffic load for each wireless cell upon assuming that the offset value is changed to the predetermined candidate value, wherein the predicting the communication speed index predicts the at least one communication speed index upon assuming that the offset value is changed to the predetermined candidate value by using a prediction result of the traffic load.

(Supplementary Note 21)

The wireless parameter control method according to any one of Supplementary Notes 16 to 20, characterized in that:

the predicting the communication speed index predicts the at least one communication speed index upon assuming that a transmission power of the first wireless cell is changed to a predetermined transmission-power-candidate-value in addition to the offset value.

(Supplementary Note 22)

The wireless parameter control method according to any one of Supplementary Notes 19 to 21, characterized in that:

the predicting the coverage controls the coverage of the first wireless cell by determining the offset value based on the evaluation value of the communication speed index and changing the offset value to the determined offset value.

(Supplementary Note 23)

The wireless parameter control method according to any one of Supplementary Notes 9 to 21, characterized in that:

the controlling the coverage controls the coverage of the first wireless cell by determining the offset value based on the evaluation value of the communication speed index and bringing the offset value close to the determined offset value.

(Supplementary Note 24)

The wireless parameter control method according to any one of Supplementary Notes 16 to 21, characterized in that:

the controlling the coverage determines a control direction of the coverage of the first wireless cell based on the evaluation value of the communication speed index and controls the coverage of the first wireless cell in the determined control direction using at least one of a transmission power and an antenna tilt angle.

(Supplementary Note 25)

The wireless parameter control method according to any one of Supplementary Notes 16 to 24, characterized in comprising:

the wireless communication system includes at least one of the second wireless cells different from the first wireless cell, wherein the offset value is a parameter that can be set to a different value for each of the second wireless cells.

(Supplementary Note 26)

The wireless parameter control method according to any one of Supplementary Notes 16 to 24, characterized in comprising:

the wireless communication system includes at least one of the second wireless cells different from the first wireless cell, wherein the offset value is a parameter whose value is common to the second wireless cells.

(Supplementary Note 27)

The wireless parameter control method according to any one of Supplementary Notes 16 to 26, characterized in that:

the wireless quality at least includes a received power or a received quality of a reference signal or a pilot channel.

(Supplementary Note 28)

The wireless parameter control method according to any one of Supplementary Notes 16 to 27, characterized in that:

the communication speed index is a throughput.

(Supplementary Note 29)

A program for a wireless parameter control apparatus in a wireless communication system in which a wireless cell which is connected to by a wireless terminal can be controlled by adding an offset value to a wireless quality of each wireless cell measured by the wireless terminal, the program making a computer as a wireless parameter control apparatus execute:

a process of predicting a wireless cell which is connected to by a first wireless terminal in a first wireless cell when an offset value to be added to a wireless quality of each wireless cell measured by the first wireless terminal is changed to a predetermined candidate value;

a process of predicting at least one communication speed index of a communication speed index of the first wireless terminal and a communication speed index of a second wireless terminal in a second wireless cell existing around the first wireless cell upon assuming that the offset value is changed to the predetermined candidate value; and a process of controlling at least one coverage of coverage of the first wireless cell and coverage of the second wireless cell based on a prediction result of the communication speed index.

(Supplementary Note 30)

The program according to Supplementary Note 29, characterized in making the computer further execute:

a process of obtaining a wireless quality of each wireless cell measured by the wireless terminal, wherein the process of predicting the communication speed index predicts the at least one communication speed index upon assuming that the offset value is changed to the predetermined candidate value, using a measurement result of a wireless quality of each wireless cell measured by the first or the second wireless terminal.

(Supplementary Note 31)

The program according to Supplementary Note 29 or Supplementary Note 30, characterized in that the process of controlling the coverage calculates an evaluation value of the communication speed index for each of the candidate values, using a prediction result of the communication speed index predicted for each of the candidate values, and controls the at least one coverage so as to improve the evaluation value of the communication speed index.

(Supplementary Note 32)

The program according to Supplementary Note 31, characterized in that:

the evaluation value of the communication speed index is calculated by using at least one of a mean value, a standard deviation value, a median, a minimum value, a maximum value of a communication speed index, a lower X % value of a cumulative distribution function, a ratio of wireless terminals at which the communication speed index is a predetermined value or below, and a ratio of wireless terminals at which the communication speed index is a predetermined value or above.

(Supplementary Note 33)

The program according to any one of Supplementary Notes 29 to 32, characterized in making the computer further execute:

a process of obtaining a traffic load for each wireless cell; and a process of predicting a traffic load for each wireless cell upon assuming that the offset value is changed to the predetermined candidate value, wherein the process of predicting the communication speed index predicts the at least one communication speed index upon assuming that the offset value is changed to the predetermined candidate value by using a prediction result of the traffic load.

(Supplementary Note 34)

The program according to any one of Supplementary Notes 29 to 33, characterized in that:

the process of predicting the communication speed index predicts the at least one communication speed index upon assuming that a transmission power of the first wireless cell is changed to a predetermined transmission-power-candidate-value in addition to the offset value.

(Supplementary Note 35)

The program according to any one of Supplementary Notes 28 to 34, characterized in that:

the process of controlling the coverage controls the coverage of the first wireless cell by determining the offset value based on the evaluation value of the communication speed index and changing the offset value to the determined offset value.

(Supplementary Note 36)

The program according to any one of Supplementary Notes 32 to 34, characterized in that:

the process of controlling the coverage controls the coverage of the first wireless cell by determining the offset value based on the evaluation value of the communication speed index and bringing the offset value close to the determined offset value.

(Supplementary Note 37)

The program according to any one of Supplementary Notes 32 to 34, characterized in that:

the process of controlling the coverage determines a control direction of the coverage of the first wireless cell based on the evaluation value of the communication speed index and controls the coverage of the first wireless cell in the determined control direction using at least one of a transmission power and an antenna tilt angle.

(Supplementary Note 38)

The program according to any one of Supplementary Notes 29 to 37, characterized in that:

the wireless communication system includes at least one of the second wireless cells different from the first wireless cell, wherein the offset value is a parameter that can be set to a different value for each of the second wireless cells.

(Supplementary Note 39)

The program according to any one of Supplementary Notes 29 to 37, characterized in that:

the wireless communication system includes at least one of the second wireless cells different from the first wireless cell, wherein the offset value is a parameter whose value is common to the second wireless cells.

(Supplementary Note 40)

The program according to any one of Supplementary Notes 29 to 39, characterized in that:

the wireless quality at least includes a received power or a received quality of a reference signal or a pilot channel.

(Supplementary Note 41)

The program according to any one of Supplementary Notes 29 to 40, characterized in that:

the communication speed index is a throughput.

INDUSTRIAL APPLICABILITY

As described above, the present invention is useful in controlling the wireless parameter of a wireless cell, and is particularly suited for improving the throughput of a wireless terminal by controlling the coverage of the wireless cell.

REFERENCE SIGNS LIST

1: wireless parameter control apparatus
2-1, 2-2: wireless base station
3-1, 3-2: wireless cell
4-1 through 4-5: wireless terminal
5: communication line
10: UE measured information obtaining unit
11: serving cell predicting unit
12: communication speed index predicting unit
13: coverage control unit
20: traffic load obtaining unit
21: traffic load predicting unit

What is claimed is:

1. A wireless parameter control apparatus in a wireless communication system in which a wireless cell which is connected to by a wireless terminal can be controlled by adding an offset value to a wireless quality of each wireless cell measured by the wireless terminal, comprising:

a first predicting unit that predicts a wireless cell which is connected to by a first wireless terminal in a first wireless cell upon assuming that an offset value to be added to a wireless quality of each wireless cell measured by the first wireless terminal is changed to a predetermined candidate value;

a second predicting unit that predicts at least one communication speed index of a communication speed index of the first wireless terminal and a communication speed index of a second wireless terminal in a second wireless cell existing around the first wireless cell upon assuming that the offset value is changed to the predetermined candidate value;

a control unit that controls at least one coverage of coverage of the first wireless cell and coverage of the second wireless cell based on a prediction result of the communication speed index; and a first obtaining unit that obtains a wireless quality of each wireless cell measured by a wireless terminal, wherein the second predicting unit predicts the at least one communication speed index upon assuming that the offset value is changed to the predetermined candidate value, using a measurement result of a wireless quality of each wireless cell measured by the first or the second wireless terminal, a wireless cell which is connected to by the first wireless terminal upon assuming that the offset value is changed to the predetermined candidate value is predicted using a value resulting from adding the candidate value to a measurement result of a wireless quality of each wireless cell measured by the first wireless terminal, and the at least one communication speed index upon assuming that the offset value is changed to the predetermined candidate value is predicted without adding the candidate value to a measurement result of a wireless quality of each wireless cell measured by the first wireless terminal or the second wireless terminal.

2. The wireless parameter control apparatus according to claim 1, wherein the control unit calculates an evaluation value of the communication speed index for each of the candidate values, using a prediction result of the communication speed index predicted for each of the candidate values, and controls the at least one coverage so as to improve the evaluation value of the communication speed index.

3. The wireless parameter control apparatus according to claim 2, wherein the evaluation value of the communication speed index is calculated by using at least one of a mean value of a communication speed index, a standard deviation value of the communication speed index, a median of the communication speed index, a minimum value of the communication speed index, a maximum value of the communication speed index, a lower X % value of a cumulative distribution function, a ratio of wireless terminals at which the communication speed index is a predetermined value or below, and a ratio of wireless terminals at which the communication speed index is a predetermined value or above.

4. The wireless parameter control apparatus according to claim 3, wherein the control unit controls the coverage of the first wireless cell by determining the offset value based on the evaluation value of the communication speed index and changing the offset value to the determined offset value.

5. The wireless parameter control apparatus according to claim 3, wherein the control unit controls the coverage of the first wireless cell by determining the offset value based on the evaluation value of the communication speed index and bringing the offset value close to the determined offset value.

6. The wireless parameter control apparatus according to claim 3, wherein:

the control unit determines a control direction of the coverage of the first wireless cell based on the evaluation value of the communication speed index and controls the coverage of the first wireless cell in the determined control direction using at least one of a transmission power and an antenna tilt angle.

7. The wireless parameter control apparatus according to claim 1, wherein a second obtaining unit that obtains a traffic load for each wireless cell; and a third predicting unit that predicts a traffic load for each wireless cell upon assuming that the offset value is changed to the predetermined candidate value, wherein the second predicting unit predicts the at least one communication speed index upon assuming that the offset value is changed to the predetermined candidate value by using a prediction result of the traffic load.

8. The wireless parameter control apparatus according to claim 1, wherein the second predicting unit predicts the at least one communication speed index upon assuming that a transmission power of the first wireless cell is changed to a predetermined transmission-power-candidate-value in addition to the offset value.

9. The wireless parameter control apparatus according to claim 1, comprising:

at least one of the second wireless cells different from the first wireless cell, wherein the offset value is a parameter that can be set to a different value for each of the second wireless cells.

10. The wireless parameter control apparatus according to claim 1, comprising
at least one of the second wireless cells different from the first wireless cell, wherein
the offset value is a parameter whose value is common to the second wireless cells.

11. The wireless parameter control apparatus according to claim 1, wherein
the wireless quality at least includes a received power or a received quality of a reference signal or a pilot channel.

12. The wireless parameter control apparatus according to claim 1, wherein
the communication speed index is a throughput.

13. A wireless communication system comprising:
the wireless parameter control apparatus according to claim 1;
a plurality of wireless base stations connected to the wireless parameter control apparatus; and
a plurality of wireless terminals each of which is connected to at least one of the plurality of wireless base stations.

14. A wireless base station comprising the wireless parameter control apparatus according to claim 1.

15. A wireless parameter control method for a wireless parameter control apparatus in a wireless communication system in which a wireless cell which is connected to by a wireless terminal can be controlled by adding an offset value to a wireless quality of each wireless cell measured by the wireless terminal, comprising:
predicting a wireless cell which is connected to by a first wireless terminal in a first wireless cell upon assuming that an offset value to be added to a wireless quality of each wireless cell measured by the first wireless terminal is changed to a predetermined candidate value;
predicting at least one communication speed index of a communication speed index of the first wireless terminal and a communication speed index of a second wireless terminal in a second wireless cell existing around the first wireless cell upon assuming that the offset value is changed to the predetermined candidate value; and
controlling at least one coverage of coverage of the first wireless cell and coverage of the second wireless cell based on a prediction result of the communication speed index, wherein
a wireless cell which is connected to by the first wireless terminal upon assuming that the offset value is changed to the predetermined candidate value is predicted using a value resulting from adding the candidate value to a measurement result of a wireless quality of each wireless cell measured by the first wireless terminal, and
the at least one communication speed index upon assuming that the offset value is changed to the predetermined candidate value is predicted without adding the candidate value to a measurement result of a wireless quality of each wireless cell measured by the first wireless terminal or the second wireless terminal.

16. A non-transitory recording medium which records a program for a wireless parameter control apparatus in a wireless communication system in which a wireless cell which is connected to by a wireless terminal can be controlled by adding an offset value to a wireless quality of each wireless cell measured by the wireless terminal, the program making a computer as a wireless parameter control apparatus execute:
a process of predicting a wireless cell which is connected to by a first wireless terminal in a first wireless cell upon assuming that an offset value to be added to a wireless quality of each wireless cell measured by the first wireless terminal is changed to a predetermined candidate value;
a process of predicting at least one communication speed index of a communication speed index of the first wireless terminal and a communication speed index of a second wireless terminal in a second wireless cell existing around the first wireless cell upon assuming that the offset value is changed to the predetermined candidate value; and
a process of controlling at least one coverage of coverage of the first wireless cell and coverage of the second wireless cell based on a prediction result of the communication speed index, wherein
a wireless cell which is connected to by the first wireless terminal upon assuming that the offset value is changed to the predetermined candidate value is predicted using a value resulting from adding the candidate value to a measurement result of a wireless quality of each wireless cell measured by the first wireless terminal, and
the at least one communication speed index upon assuming that the offset value is changed to the predetermined candidate value is predicted without adding the candidate value to a measurement result of a wireless quality of each wireless cell measured by the first wireless terminal or the second wireless terminal.

* * * * *